(12) United States Patent
Hung

(10) Patent No.: US 8,743,180 B2
(45) Date of Patent: Jun. 3, 2014

(54) SYSTEMS AND METHODS FOR GENERATING A DEPTH MAP AND CONVERTING TWO-DIMENSIONAL DATA TO STEREOSCOPIC DATA

(75) Inventor: Hao-Ping Hung, New Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 469 days.

(21) Appl. No.: 13/170,505

(22) Filed: Jun. 28, 2011

(65) Prior Publication Data

US 2013/0002645 A1  Jan. 3, 2013

(51) Int. Cl.
*G06T 15/00* (2011.01)

(52) U.S. Cl.
USPC .......................................................... 348/46

(58) Field of Classification Search
USPC .............. 345/419; 348/469, 537; 375/240.01; 386/95
See application file for complete search history.

(56) References Cited

U.S. PATENT DOCUMENTS

| 5,274,449 | A | * | 12/1993 | Keesen | 348/469 |
| 7,573,475 | B2 | | 8/2009 | Sullivan et al. | |
| 7,689,031 | B2 | | 3/2010 | Berretty et al. | |
| 2003/0218606 | A1 | * | 11/2003 | Zhirkov et al. | 345/419 |
| 2007/0024614 | A1 | | 2/2007 | Tam et al. | |
| 2007/0291110 | A1 | | 12/2007 | Era | |
| 2008/0031327 | A1 | | 2/2008 | Wang et al. | |
| 2008/0085049 | A1 | | 4/2008 | Naske et al. | |
| 2010/0073364 | A1 | | 3/2010 | Jung et al. | |
| 2010/0142924 | A1 | * | 6/2010 | Yamashita et al. | 386/95 |
| 2011/0261050 | A1 | * | 10/2011 | Smolic et al. | 345/419 |
| 2012/0008672 | A1 | * | 1/2012 | Gaddy et al. | 375/240.01 |
| 2012/0013614 | A1 | * | 1/2012 | Matsuhiro et al. | 345/419 |

FOREIGN PATENT DOCUMENTS

WO  2010018880  2/2010

* cited by examiner

*Primary Examiner* — Y Lee
*Assistant Examiner* — Salame Amr
(74) *Attorney, Agent, or Firm* — McClure, Qualey & Rodack, LLP

(57) ABSTRACT

Systems and methods for performing multimedia conversion are disclosed. In a multimedia conversion system for converting two-dimensional (2D) multimedia data to stereoscopic multimedia data, an absolute difference between pixel pairs is determined for each scan line in a frame of the 2D multimedia data. The absolute difference values are accumulated, and a depth map is derived based on the accumulated difference values. The depth map is applied to the frame in the 2D multimedia data.

27 Claims, 10 Drawing Sheets

SYSTEMS AND METHODS FOR GENERATING A DEPTH MAP AND CONVERTING TWO-DIMENSIONAL DATA TO STEREOSCOPIC DATA

TECHNICAL FIELD

The present disclosure generally relates to multimedia data processing and particularly, to the conversion of two-dimensional data to stereoscopic data.

BACKGROUND

Stereoscopic video systems are designed to duplicate real-world experience by providing each eye a unique version of the video. By displaying a separate image for each eye, a stereoscopic image is created. Objects in a stereoscopic video may appear to be in front of or behind the screen. To view stereoscopic video, the display technology and the corresponding 3D glasses ensure that the left eye sees only the video meant for the left eye, and so on for the right eye. There are a number of different technologies that are designed to accomplish this, and each technology has its own benefits, drawbacks and costs. As stereoscopic video gains increasing popularity, more tools are becoming available for converting existing two-dimensional (2D) video into stereoscopic videos. One perceived shortcoming, however, is that the conversion of 2D videos to stereoscopic videos typically requires a large number of resources from a computational standpoint. As such, conventional techniques for image analysis may not be suitable for various platforms due to their high degree of complexity.

SUMMARY

Briefly described, one embodiment, among others, is a method implemented in a multimedia conversion system for converting two-dimensional (2D) multimedia data to stereoscopic multimedia data. The method comprises determining vertical characteristics of pixels in a frame of the 2D multimedia data, wherein determining vertical characteristics of the pixels comprises for each scan line in the frame, determining a difference between pixel pairs in a current scan line and in a second scan line The method further comprises calculating a depth for each pixel in the 2D multimedia data according to a depth of a vertical pixel in the second scan line and the determined vertical characteristics of the pixel and generating a complementary stereoscopic image pair according to the depth of each pixel.

Another embodiment is a method implemented in a multimedia conversion system for converting two-dimensional (2D) multimedia data to stereoscopic multimedia data. The method comprises determining, for each scan line in a frame of the 2D multimedia data, an absolute difference between pixel pairs. The method further comprises accumulating the absolute difference values, deriving a depth map based on the accumulated difference values, and applying the depth map to the frame in the 2D multimedia data.

Another embodiment is a system for converting two-dimensional (2D) multimedia data to stereoscopic multimedia data. The system comprises a comparator configured to determine, for all scan lines in the frame, an absolute difference value between corresponding pixels in pairs of scan lines in the frame. The system further comprises an accumulator configured to accumulate the relative difference values, a depth map generator configured to derive a depth map based on the accumulated relative difference values and based on the 2D multimedia data, and a 2D-to-stereoscopic converter configured to apply the depth map to generate a stereoscopic multimedia data from the 2D multimedia data.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
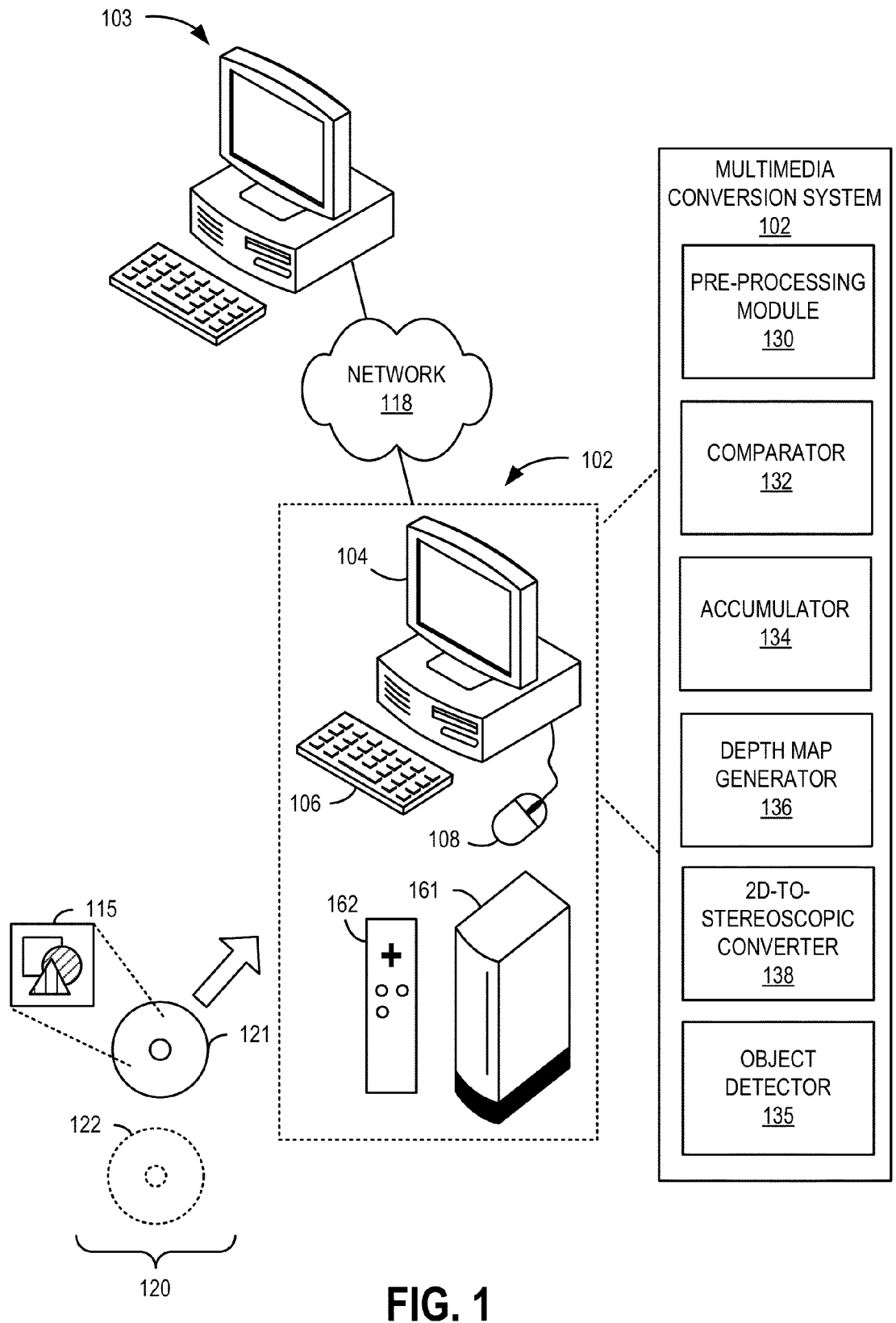
FIG. 1 is a block diagram of an environment in which embodiments of a multimedia conversion system 102 may be implemented

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

The conversion of two-dimensional (2D) to three-dimensional (stereoscopic) images during video playback has become increasingly popular. Typical approaches to generating a pair of stereo images from a single image involve deriving a depth map by analyzing the image content. The depth map identifies the relative position of each pixel in the three-dimensional domain, thereby indicating the distance of the surface of a scene object from a given viewpoint. Using the depth map, a stereoscopic image can be rendered from a 2D image.

However, one perceived shortcoming with conventional approaches to 2D-to-stereoscopic conversion is that generation of depth maps is generally a computational intensive operation and can thus be a bottleneck during the playback process. First, it can be difficult to perform segmentation of objects within a digital image and assign different depths to the various objects. As those skilled in the art will appreciate, even a small error during the segmentation process can result in artifacts being displayed in the generated stereoscopic output. With playback applications executing on a computing platform, CPU usage is critical, and thus, conventional image analyzing techniques may not be suitable due to the computational resources required.

Embodiments are described for generating the depth map for 2D-to-stereoscopic image conversion. In accordance with various embodiments, a depth map is generated according to the geometry structure of each frame within a 2D video by analyzing the attributes associated with pixels in a pair of scan lines. In some cases, the pair of scan lines may comprise a current scan line and a neighboring scan line. Note, however, that the pair of scan lines are not restricted to neighboring scan lines. By simplifying multi-dimensional array computations to one-dimensional array computations, the computational complexity can be significantly reduced. Furthermore, as object segmentation is not utilized, a reduction in artifacts can also be achieved. A description of a system for performing 2D-to-stereoscopic conversion is now described followed by a discussion of the operation of the components within the system.

FIG. 1 is a block diagram of an environment in which embodiments of a multimedia conversion system 102 may be implemented. The multimedia conversion system 102 may be embodied, for example, as a desktop computer, computer workstation, laptop, or other computing platform. In other embodiments, the multimedia conversion system 102 may be embodied as a video gaming console 161, which includes a video game controller 162 for receiving user preferences. For such embodiments, the video gaming console 161 may be connected to a television (not shown) or other display.

The multimedia conversion system 102 includes a display 104 and input devices such as a keyboard 106 and a mouse 108. For some embodiments, the multimedia conversion system 102 comprises a pre-processing module 130, a comparator 132, an accumulator 134, a depth map generator 136, and a 2D-to-stereoscopic converter 138. As will be described in more detail later, the pre-processing module 130 is configured to remove any letterboxing effect that is present in the video content 115 to be converted. The multimedia conversion system 102 further comprises a comparator 132 configured to process scan lines and determine a relative absolute difference between depth values of corresponding pixels in the scan lines. The accumulator 134 is configured to accumulate the values derived by the comparator 132 in a sequential fashion beginning with the scan line at the top of the frame and generate a monotonically increasing set of values.

The depth map generator 136 within the multimedia conversion system 102 is configured to derive a depth map based on the output of the comparator and based on the 2D video. Utilizing the depth map, the 2D-to-stereoscopic converter generates stereoscopic data, which may be output to the display 104 or other destination. For some embodiments, the multimedia conversion system 102 also includes an object detector 135 configured to determine whether a current frame of the 2D multimedia data only contains scenery objects based on whether the current frame contains any human faces. For some implementations, the multimedia conversion system 102 may utilize multiple 2D-to-stereoscopic conversion methods. If no face is detected by the object detector 135, then the face-based conversion method may be disabled, and the remaining conversion methods are utilized. For 2D multimedia data comprising 2D video, the object detector 135 may be configured to detect objects on a frame-by-frame basis.

Figure 2:
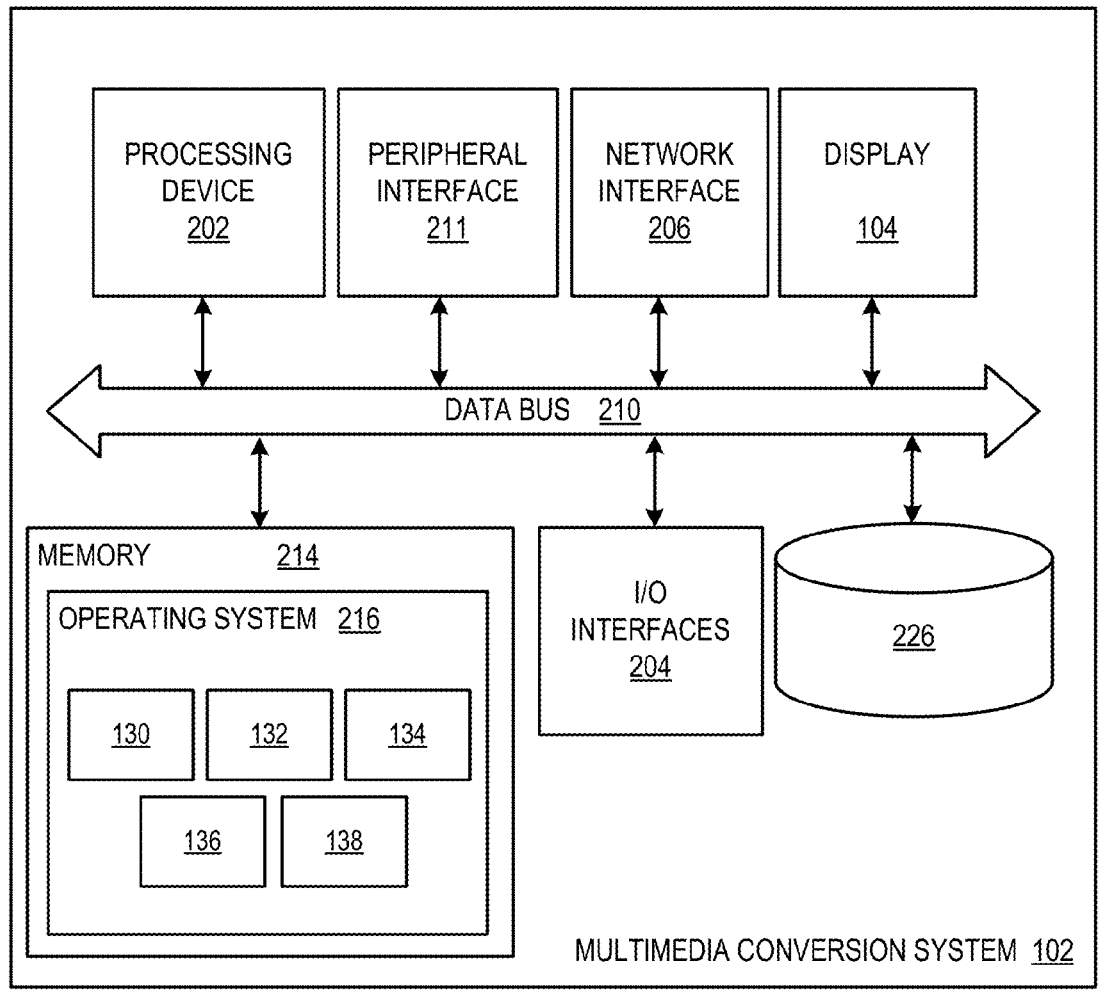
FIG. 2 is a schematic diagram of the multimedia conversion system shown in FIG. 1.

The multimedia conversion system 102 in FIG. 2 is configured to receive video content 115 from various sources. For some implementations, the video content 115 is retrieved from a storage medium 120 such as, for example, an optical disc 120, or other tangible storage medium. As one of ordinary skill will appreciate, the video content 115 may be encoded in various formats. The multimedia conversion system 102 may support any one of a number of common computer interfaces, such as, but not limited to IEEE-1394 High Performance Serial Bus (Firewire), USB, a serial connection, and a parallel connection. The multimedia conversion system 102 may also be coupled to a network 118, such as the Internet or a local area network (LAN). Through the network 118, the multimedia conversion system 102 may receive video content 115 from another media display system 103. Utilizing the components described above, the multimedia conversion system 102 converts two-dimensional (2D) video to three-dimensional (stereoscopic) format based on depth information.

FIG. 2 is a schematic of the multimedia conversion system 102 shown in FIG. 1. The multimedia conversion system 102 may be embodied in any one of a wide variety of wired and/or wireless computing devices, such as a desktop computer, portable computer, dedicated server computer, multiprocessor computing device, smartphone, personal digital assistant (PDA), digital camera, and so forth. As shown in FIG. 2, the multimedia conversion system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the multimedia conversion system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 416, one or more native applications, emulation systems, or emulated applications for any of a variety of operating systems and/or emulated hardware platforms, emulated operating systems, etc. For example, the applications may include application specific software which may comprise some or all the components 130, 132, 134, 136, 138 of the multimedia conversion system 102 depicted in FIG. 1. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the multimedia conversion system 102 comprises a personal computer, these components may interface with one or more user input devices 204, which may comprise a keyboard 106 or a mouse 108, as shown in FIG. 1. The display 104 may comprise a computer monitor, a plasma screen for a PC, a liquid crystal display (LCD) on a hand held device, or other display device.

In the context of this disclosure, a computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface device 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The multimedia conversion system 102 may communicate with one or more media display systems 103 via the network interface 206 over the network 118. The multimedia conversion system 102 may further comprise mass storage 226. The peripheral 211 interface supports various interfaces including, but not limited to IEEE-1394 High Performance Serial Bus (Firewire), USB, a serial connection, and a parallel connection.

Figure 4:
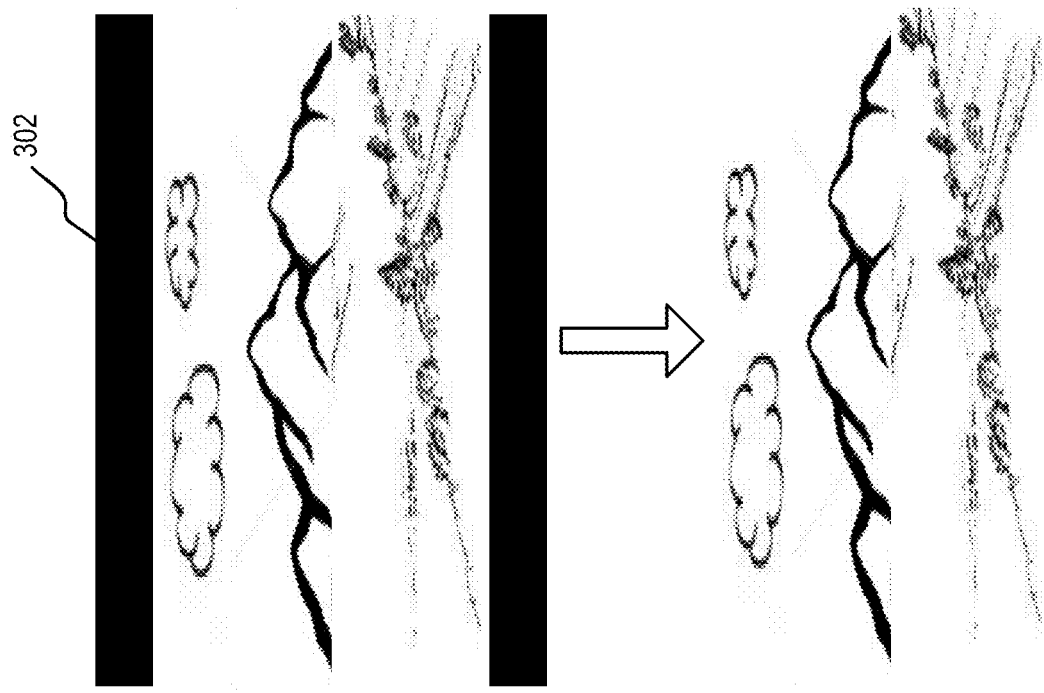
FIG. 4 illustrates operation of the pre-processing module.
Figure 4:
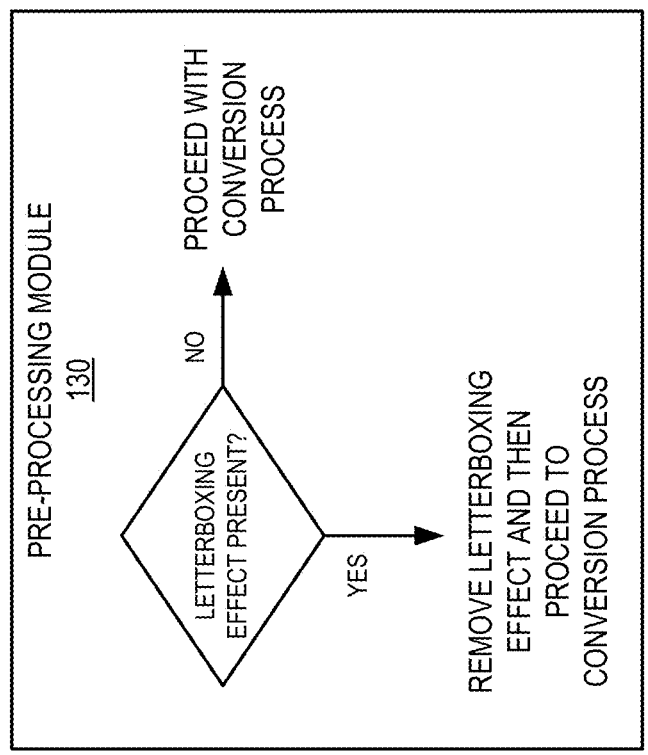

Having described various components in which embodiments of generating a depth map may be implemented, an example is now described to further illustrate various aspects. Reference is made to FIG. 4, which depicts the pre-processing module 130 of FIG. 1. In accordance with various embodiments, the pre-processing module 130 is configured to remove any letterboxing effect that is present in the image 302 to be converted. Because the black bars at the top and bottom of the image 302 will affect the derivation of vertical characteristics associated with the image 302, the pre-processing module 130 filters or removes these bars prior to the conversion process.

Figure 3:
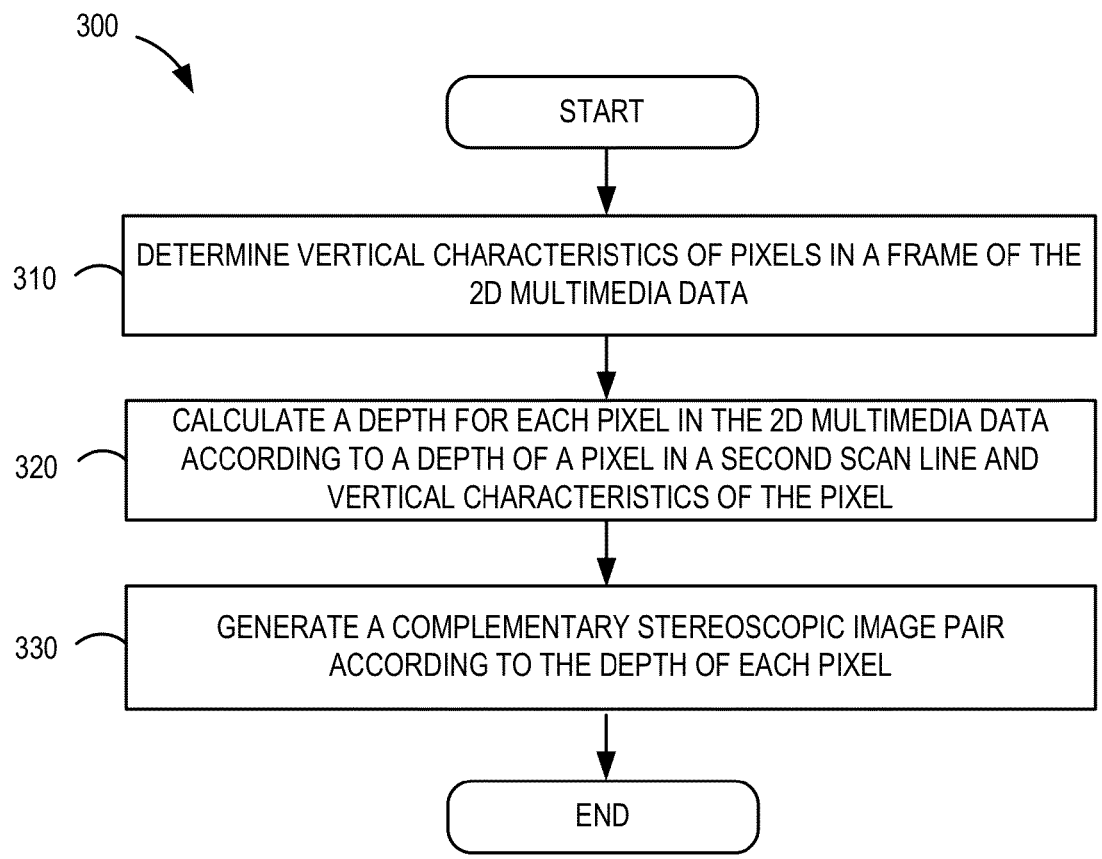
FIG. 3 is a flowchart for a method for converting two-dimensional (2D) multimedia data to stereoscopic multimedia data implemented in the multimedia conversion system of FIG. 1.

Reference is now made to FIG. 3, which is a flowchart 300 for a method for 2D-to-stereoscopic conversion implemented in the multimedia conversion system 102 of FIG. 1. If embodied in software, each block depicted in FIG. 3 represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processor in a computer system or other system such as the one shown in FIG. 1. The machine code may be converted from the source code, etc. If embodied in hardware, each block may represent a circuit or a number of interconnected circuits to implement the specified logical function(s).

Although the flowchart 300 of FIG. 3 shows a specific order of execution, it is understood that the order of execution may differ from that which is depicted. In block 310, vertical characteristics relating to pixels in a frame of the 2D multimedia data to be converted are determined. As described in more detail below, vertical characteristics may comprise a running sum associated with pixels, where a progressive calculation is performed of the sum of difference values, beginning with the difference value associated with the pixel in the first scan line at the top of the frame. In block 320, the depth information for each pixel in the 2D multimedia data is calculated according to depth information associated with vertical pixels and according to the vertical characteristics of the pixel. Note that the vertical pixels comprise pixels in two scan lines, which may or may not be neighboring scan lines.

Note that for some embodiments, if the resolution of the 2D multimedia data is too large, the resolution of the 2D multimedia data is reduced. The depth map is generated according to the reduced-resolution 2D multimedia data. In block 330, a complementary stereoscopic image pair is generated according to the depth information associated with each pixel. If the resolution of the 2D multimedia data was reduced, the complementary stereoscopic image pair is generated according to the depth map derived according to the reduced-resolution 2D multimedia data. In accordance with such embodiments, the depth is first enlarged using interpolation techniques to the resolution of the original 2D multimedia data. The enlarged depth map is then applied to generate the complementary stereoscopic image pair.

In accordance with various embodiments, the left-eye and right-eye image pair is generated from a depth map using a DIBR (depth image based rendering) technique. The DIBR technique involves synthesizing virtual views of a scene from 1) still or moving color images; and 2) the associated per-pixel depth information. Conceptually, this process of view generation comprises a two-step process. First, the original image points are projected onto the stereoscopic image space utilizing respective depth data. The stereoscopic space points are then projected into the image plane of a virtual camera, which is located at the required viewing position. Thus, for a specific position on the depth map, the depth intensity is transformed according to a horizontal shift between the left-eye image and the right-eye image.

Reference is now made to FIGS. 4-7, which illustrate various aspects of embodiments for 2D-to-stereoscopic conversion. With reference to FIG. 4, the pre-processing module 130 is configured to analyze frames in the 2D video and remove any letterboxing effect that is present. The various embodiments described generally operate on the assumption that with scenic frames, objects towards the top of a frame are typically farther away than objects closer to the bottom of the frame. Thus, the various embodiments for depth map generation are based on a basic concept involving layout/composition when capturing an image. Specifically, the basic concept is that in an image or photo, objects (e.g., the sky, clouds) located in the upper portion are usually farther away from a depth perspective than objects (such as the ground) located in the lower portion of the image. Thus, the embodiments for depth map generation typically generate depth maps with smaller intensity for the upper portion of the image as the objects in the upper portion are generally farther away. Similarly, high intensity is involved for the lower portion of the image as objects in this portion are generally closer (i.e., have lower depth values)

Consider, for example, the image 302 depicted in FIG. 4, where the clouds towards the top of the image 302 are assumed to be farther away than the trees and terrain shown towards the bottom of the image 302. For the depth map generated based on geometry structure of the image in the frame, objects that are farther away (e.g., the clouds in the frame 302 in FIG. 4) will be assigned a smaller depth value, while objects that are closer (e.g., the trees located towards the bottom of the frame 302) will be assigned a larger depth value based on the running sum performed starting from the top of the image 302.

An algorithm for depth map generation is now described. First, for a given horizontal position y where $1 \leq y \leq H$ and where H represents the height of the image, the following metrics are calculated as follows:

1) the scan line absolute difference between pixels in two scan lines:

$$D_1[y] = \sum_{x=1}^{W} \text{abs}(p(x, y) - p(x, y-k));$$

2) difference between pixels in a scan line:

$$D_2[y] = \sum_{x=1}^{W} p(x, y) - p(x-k, y);$$

and 3) the absolute difference between pixels in the scan line:

$$D_3[y] = \sum_{x=1}^{W} \text{abs}(p(x, y) - p(x-k, y)).$$

In the expressions above, the parameter W is the image width, abs( ) denotes the absolute function, p(x, y) denotes the pixel value at position (x, y), and k is a constant.

The calculations above yield three one-dimensional (1D) arrays ($D_1, D_2, D_3$). Based on the elements in these 1D arrays, a running sum for each position y is then generated. Specifically, the running sum is calculated according to the equation below:

$$\text{Sum}[y] = \sum_{i=1}^{y} (w_1 * D_1[i] + w_2 * D_2[i] + w_3 * D_3[i]).$$

As reflected in the equation above, the three difference factors ($D_1, D_2, D_3$) are assigned corresponding weighting factors. This provides flexibility when determining the vertical characteristics as not all three factors have to always be used. Note, however, that at least one of the weighting factors is typically assigned a non-zero value, otherwise the running sum would result in a value of zero.

Finally, utilizing the running sum, each element in Sum[] is normalized into the range [0, 255] and the normalized value (Norm[y]) represents the depth value at position (x, y) in the image. For various embodiments, the depth map is then used to generate stereoscopic images using depth-image-based rendering (DIBR) techniques.

Figure 5:
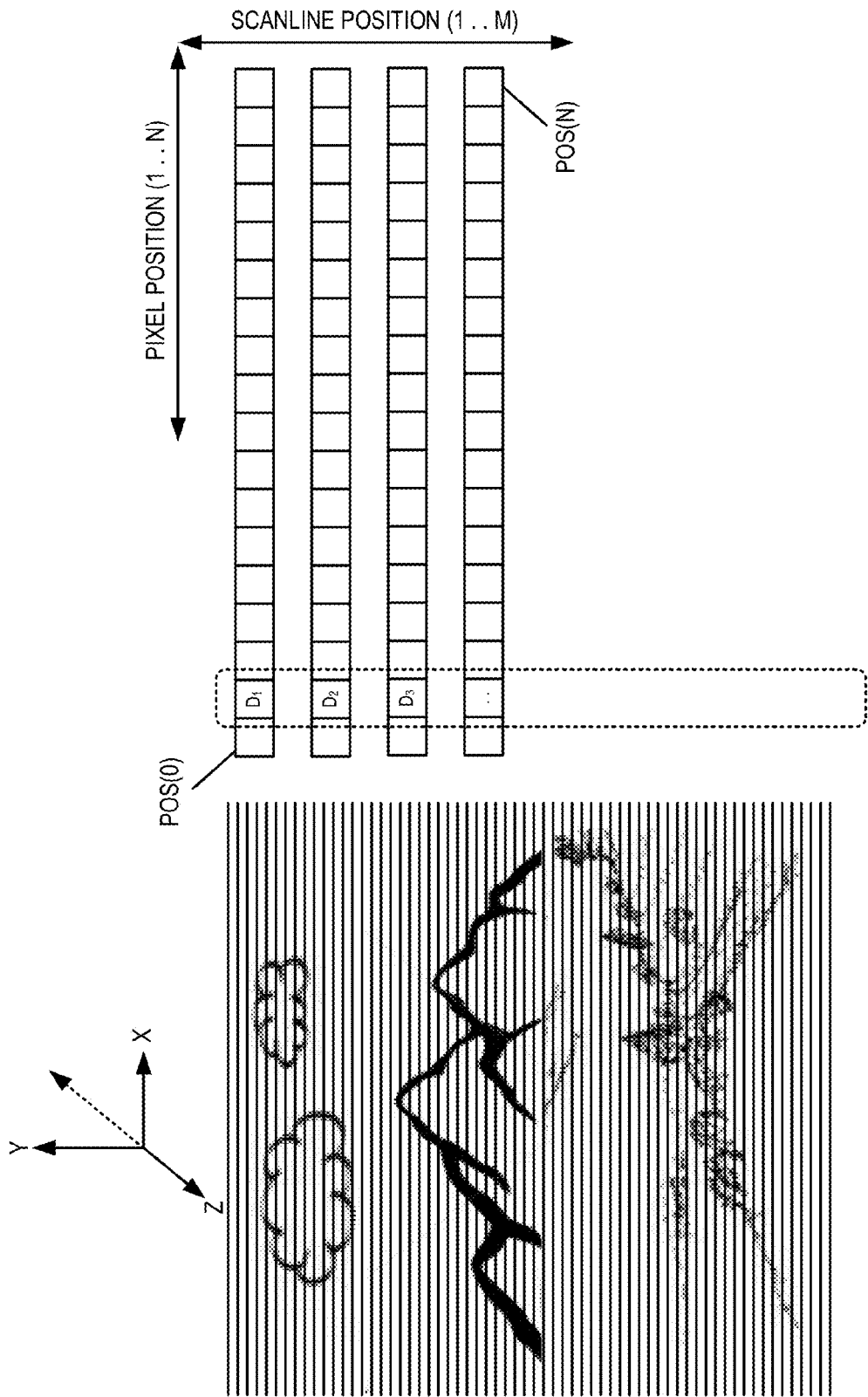
FIG. 5 illustrates an example frame undergoing processing in the multimedia conversion system of FIG. 1.
Figure 6:
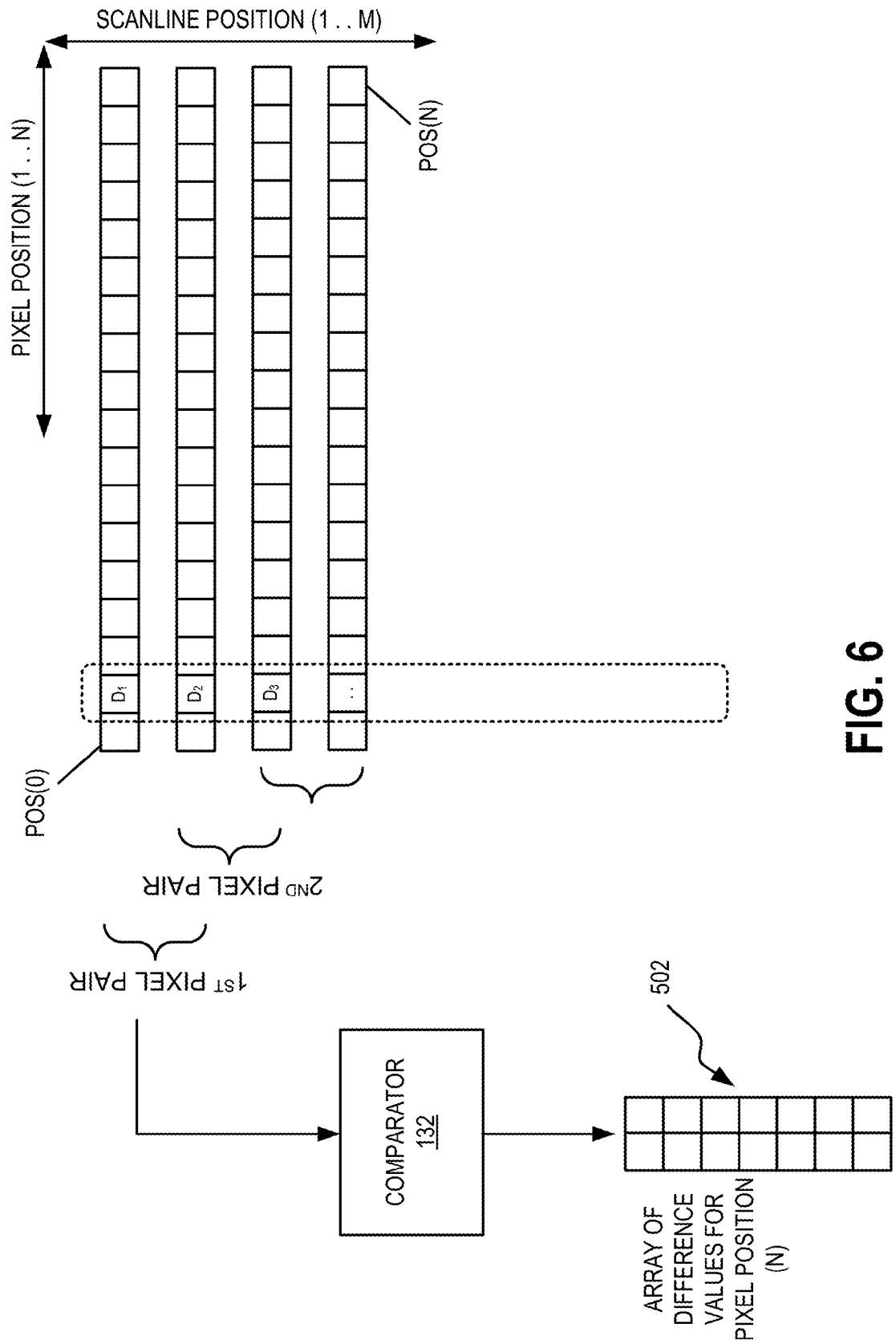
FIG. 6 illustrates operation of the comparator.

FIGS. 5 and 6 illustrate the processing of scan line pairs in a given frame. As shown in FIG. 5, each scan line comprises a row of pixels comprising 1 to N pixel positions. The frame further comprises M scan lines.

With reference to FIG. 6, the comparator 132 is configured to determine, for all the scan lines in the frame, a relative difference value between corresponding pixels in pairs of scan lines in the frame. Starting with the first pixel position, POS(0), and proceeding to POS(N), the comparator calculates the absolute difference in depth values between a current scan line (scan line a) and a neighboring scan line (scan line a+1) from each of the M scan lines such that a given pixel position (POS(n)) will have a column of absolute difference values corresponding to the M scan lines. Note that while the example above refers to a neighboring scan line, the difference values may also be calculated between a current scan line and a second scan line, where the second scan line comprises, for example, scan line a+k (or a-k), where k is a value greater than one and less than a. For example, the comparator 132 calculates the absolute difference between the values $D_2$ and $D_1$, as shown in FIG. 6. The comparator 132 then calculates the absolute difference between values $D_3$ and $D_2$ and so on. The absolute difference values corresponding to each scan line pair is stored in an array or other data structure in memory.

Figure 7:
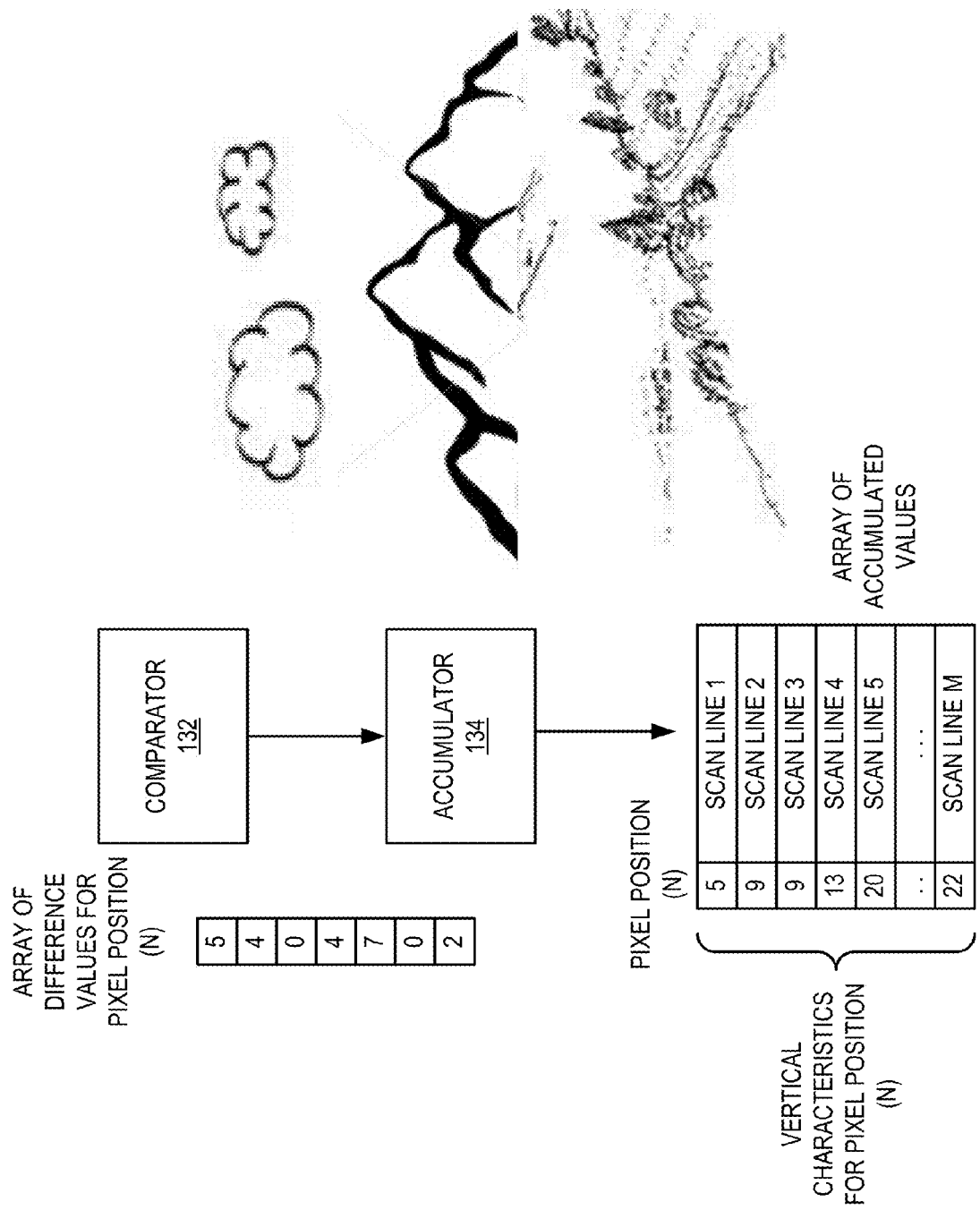
FIG. 7 illustrates operation of the accumulator.

Turning to FIG. 7, the accumulator 134 receives the array of difference values from the comparator 132 and calculates a running sum of the absolute difference values across all the scan lines, beginning with the first scan line at the top of the current frame being processed. The running sum for a given pixel represents a vertical characteristic of that pixel. The accumulator 134 outputs an array of vertical characteristics for each pixel position, ranging from 1 to N such that N one-dimensional arrays are sent to the depth map generator 136.

Figure 8:
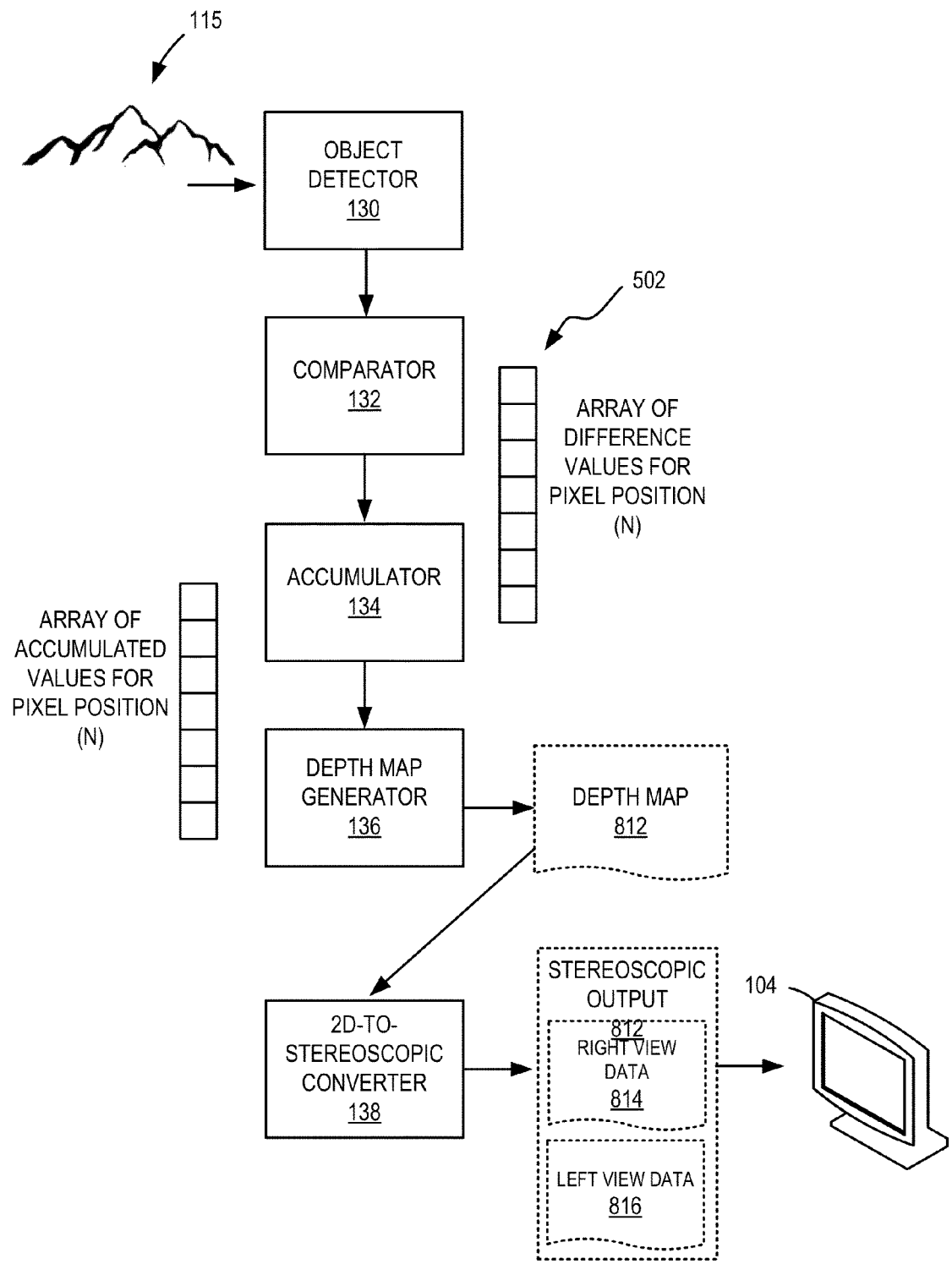
FIG. 8 illustrates the general signal flow for generating a depth map and generating a stereoscopic output.

With reference to FIG. 8, the depth map generator 136 generates a depth map 812 based on the derived vertical characteristics. For some embodiments, the depth information for each pixel in a frame is derived by calculating a weighted average of the depth of a pixel in a second scan line and the vertical characteristic (or accumulated value) for that pixel, where the depth information is derived across all pixel positions and across all scan lines. As shown, the derived depth map 812 is sent to the 2D-to-stereoscopic converter, which generates a stereoscopic output 812 comprising right view data 814 and left view data 816.

Figure 9:
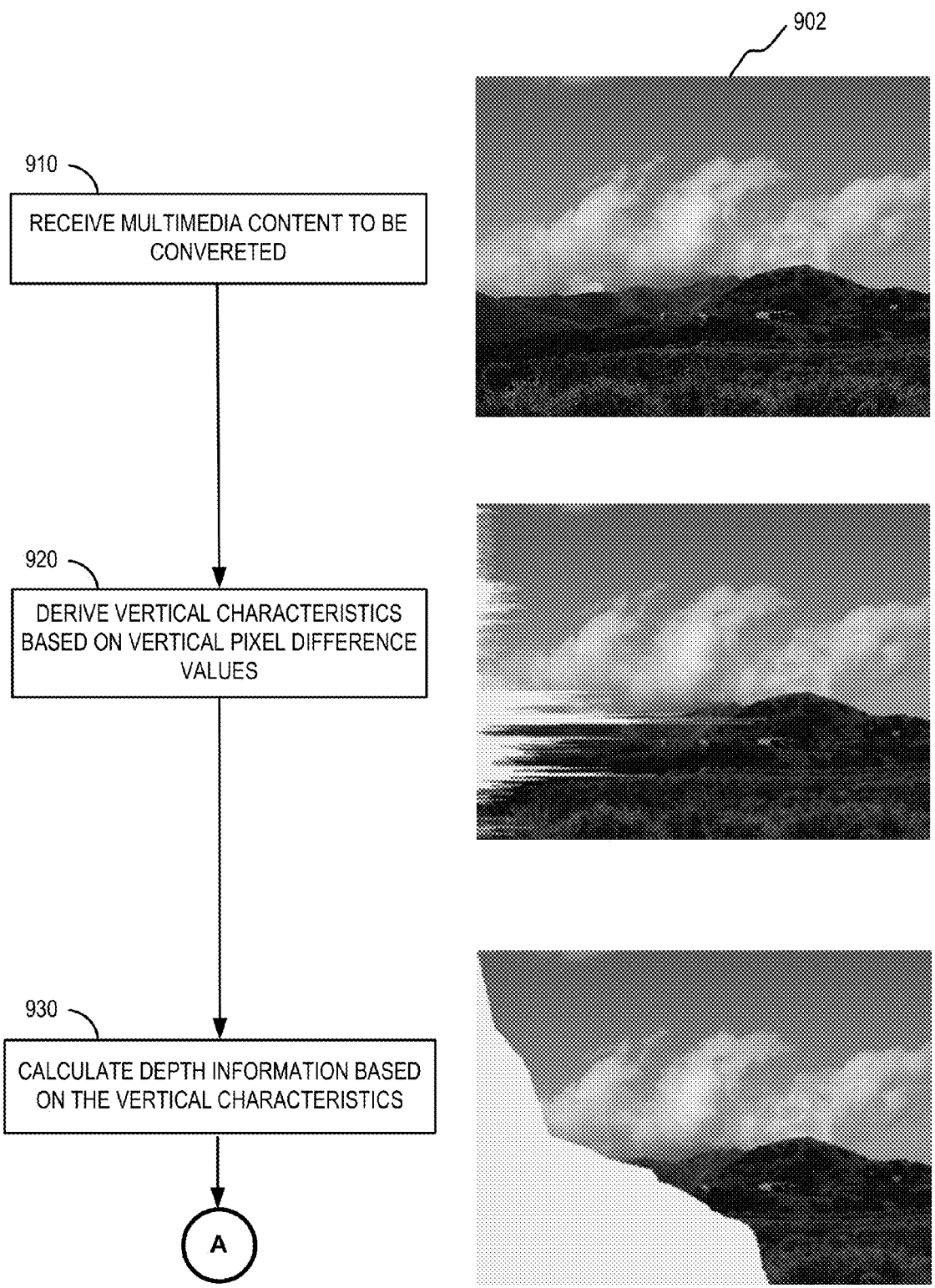
FIGS. 9 and 10 illustrate the conversion process.
Figure 10:
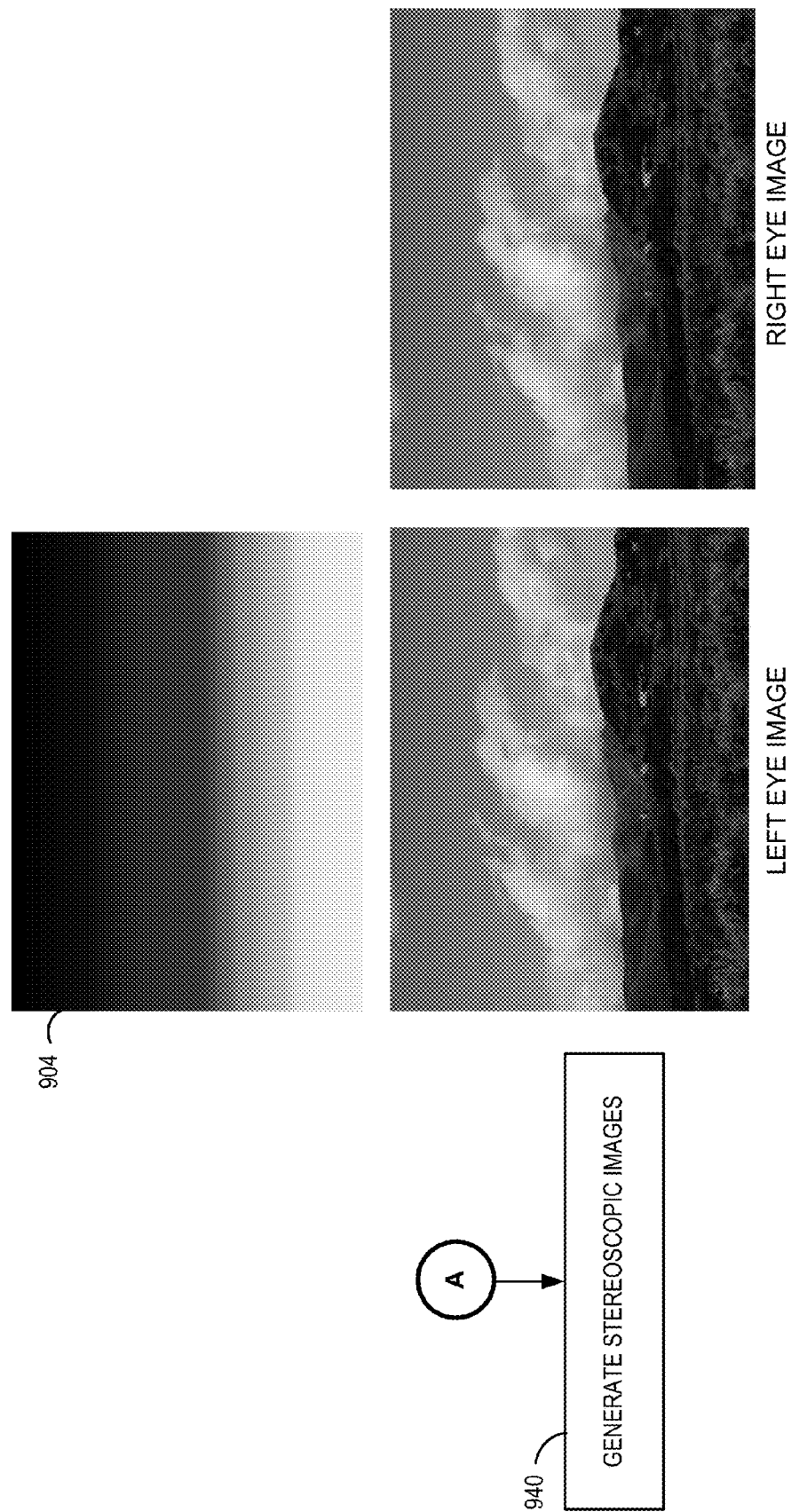

To further illustrate the conversion technique described herein, reference is made to FIGS. 9 and 10. Beginning with block 910, multimedia content 902 to be converted is received. In block 920, vertical characteristics are derived based on vertical pixel difference values. As described earlier, such parameters as scan line absolute difference values, difference values, and absolute difference values are calculated, thereby producing a series of 1D arrays. The derived vertical characteristics are shown to the right superimposed on the multimedia content 902 (for illustration purposes only). In block 930, depth information is calculated based on the derived vertical characteristics. Specifically, a running sum for each pixel position is calculated. As described earlier, the running sum may be normalized according to a range (e.g., [0, 255]). The monotonically increasing curve representing the depth information is shown on the right superimposed on the multimedia content 902 (again, for illustration purposes). A representation of the derived depth map 904 is also shown, where the intensity is less at the upper portion than at the lower portion due to the objects towards the bottom being closer. In block 940, stereoscopic images are generated based on the calculated depth information.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method implemented in a multimedia conversion system for converting two-dimensional (2D) multimedia data to stereoscopic multimedia data, comprising:

determining vertical characteristics of pixels in a frame of the 2D multimedia data, wherein determining vertical characteristics of the pixels comprises for each scan line in the frame, determining a difference between pixel pairs comprising a pixel in a current scan line and a pixel in a second scan line, wherein the vertical characteristics comprise at least one of: a scan line absolute difference; a difference between pixels in the second scan line; and an absolute difference between pixels in the second scan line, wherein determining vertical characteristics further comprises determining a running sum for each position y, wherein determining a running sum is calculated according to the following:

$$\text{Sum}[y] = \sum_{i=1}^{y} (w_1 * D_1[i] + w_2 * D_2[i] + w_3 * D_3[i])$$

wherein Sum[y] represents the running sum, $D_1[i]$ represents the scan line absolute difference, $D_2[i]$ represents the difference between pixels in the second scan line, $D_3[i]$ represents the absolute difference between neighboring pixels in the second scan line, and $w_1, w_2, w_3$ are weighting factors of $D_1, D_2, D_3$;

calculating a depth for each pixel in the 2D multimedia data according to a depth of a vertical pixel in the second scan line and the determined vertical characteristics of the pixel; and generating a complementary stereoscopic image pair according to the depth of each pixel.

2. The method of claim 1, wherein the second scan line is a neighboring scan line of the current scan line.

3. The method of claim 1, further comprising prior to the steps of determining, calculating, and generating, performing the step of removing any letterboxing effect present in the 2D multimedia data.

4. The method of claim 1, wherein the difference between pixel pairs is an absolute difference.

5. The method of claim 1, wherein the difference between pixel pairs is normalized according to an absolute difference.

6. The method of claim 1, wherein the scan line absolute difference is calculated according to the following:

$$D_1[y] = \sum_{x=1}^{W} \text{abs}(p(x, y) - p(x, y-k)),$$

wherein $D_1[y]$ represents the scan line absolute difference; abs( ) is an absolute function; p(x, y) represents a pixel value at position (x, y); W is an image width of the frame of the 2D multimedia data; and k is a constant.

7. The method of claim 1, wherein the difference between pixels in the second scan line is calculated according to the following:

$$D_2[y] = \sum_{x=1}^{W} p(x, y) - p(x-k, y),$$

wherein p(x, y) represents a pixel value at position (x, y); W is an image width of the frame of the 2D multimedia data; and k is a constant.

8. The method of claim 1, wherein the absolute difference between pixels in the second scan line is calculated according to the following:

$$D_3[y] = \sum_{x=1}^{W} \text{abs}(p(x, y) - p(x-k, y)),$$

wherein abs( ) is an absolute value function; p(x, y) represents a pixel value at position (x, y); W is the image width of the frame of the 2D multimedia data; and k is a constant.

9. The method of claim 1, wherein determining vertical characteristics further comprises determining a running sum for each position y, wherein determining a running sum is calculated according to the following:

$$\text{Sum}[y] = \sum_{i=1}^{y} \max(w_1 * D_1[i] + w_2 * D_2[i] + w_3 * D_3[i], \text{lower\_bound}),$$

wherein Sum[y] represents the running sum, $D_1[i]$ represents the scan line absolute difference, $D_2[i]$ represents the difference between pixels in the second scan line, $D_3[i]$ represents the absolute difference between neighboring pixels in the second scan line, max ( ) represents a maximum function, and $w_1, w_2, w_3$ are weighting factors of $D_1, D_2, D_3$.

10. The method of claim 1, wherein the depth at a specific vertical position y is determined by:

Depth[y]=g(f(y), Depth[y−k]), wherein the function f denotes vertical characteristics and g denotes a function to transform the depth at reference position y−k and the vertical characteristic into a depth at the target position, where k is greater than zero.

11. The method of claim 1, wherein the running sum is calculated beginning with a difference value associated with the first scan line at the top of the frame and progressing on a pixel-by-pixel basis to the scan line at the bottom of the frame.

12. A method implemented in a multimedia conversion system for converting two-dimensional (2D) multimedia data to stereoscopic multimedia data, comprising:

determining, for each scan line in a frame of the 2D multimedia data, a scan line absolute difference comprising an absolute difference between pixel pairs;

accumulating the absolute difference values;

determining a running sum for each position y, wherein determining a running sum is calculated according to the following:

$$\text{Sum}[y] = \sum_{i=1}^{y} (w_1 * D_1[i] + w_2 * D_2[i] + w_3 * D_3[i])$$

wherein Sum[y] represents the running sum, $D_1[i]$ represents the accumulated absolute difference values $D_2[i]$ represents a difference between pixels in a scan line, $D_3[i]$ represents the accumulated absolute difference between pixel pairs in the scan line, and $w_1, w_2, w_3$, are weighting factors of $D_1, D_2, D_3$;

deriving a depth map based on the running sum; and applying the depth map to the frame in the 2D multimedia data.

13. The method of claim 12, wherein applying the depth map to the frame in the 2D multimedia data is performed according to a depth-image-based rendering (DIBR) technique.

14. The method of claim 12, wherein determining the scan line absolute difference comprises determining a difference of a pixel in a current scan line and a pixel in a second scan line, wherein the pixel in the current scan line and the pixel in the second scan line are in a same relative horizontal pixel position.

15. The method of claim 12, wherein accumulating the difference values is performed for a same relative horizontal pixel position in both the current scan line and a second scan line.

16. The method of claim 15, wherein the second scan line is a neighboring scan line of the current scan line.

17. The method of claim 15, wherein accumulating the difference values is performed sequentially beginning with the first scan line at the top of the frame to the last scan line at the bottom of the frame.

18. The method of claim 12, further comprising storing the accumulated difference values in a one-dimensional (1D) array, wherein the total number of entries in the 1D array corresponds to the total number of scan lines in the frame.

19. The method of claim 12, further comprising:
based on a resolution of the 2D multimedia data, reducing the resolution of the 2D multimedia data prior to calculating a depth for each pixel in the 2D multimedia data.

20. A system for converting two-dimensional (2D) multimedia data to stereoscopic multimedia data, comprising:
a comparator configured to determine, for all scan lines in the frame, an absolute difference value between corresponding pixels in pairs of scan lines in the frame;
an accumulator configured to accumulate the absolute difference values to generate a scan line absolute difference, wherein the accumulator is further configured to determine a running sum for each position y, wherein determining a running sum is calculated according to the following:

$$\text{Sum}[y] = \sum_{i=1}^{y} (w_1 * D_1[i] + w_2 * D_2[i] + w_3 * D_3[i])$$

wherein Sum[y] represents the running sum, $D_1[i]$ represents the scan line absolute difference $D_2[i]$ represents a difference between pixels in a scan line $D_3[i]$ represents the accumulated absolute difference between pixel pairs in the scan line, and $w_1, w_2, w_3$ are weighting factors of $D_1, D_2, D_3$;
a depth map generator configured to derive a depth map based on the running sum and based on the 2D multimedia data; and
a 2D-to-stereoscopic converter configured to apply the depth map to generate a stereoscopic multimedia data from the 2D multimedia data.

21. The system of claim 20, further comprising a pre-processing module configured to remove any letterboxing effect present in the 2D multimedia data.

22. The system of claim 20, wherein the comparator determines an absolute difference value between corresponding pixels in pairs of scan lines in the frame across all pixel positions in the frame.

23. The system of claim 20, further comprising an object detector configured to determine whether a current frame of the 2D multimedia data only contains scenery objects.

24. The system of claim 23, wherein the object detector determines whether a current frame of the 2D multimedia data only contains scenery objects based on whether the current frame contains any human faces.

25. The system of claim 20, wherein the pairs of scan lines comprise a current scan line and a second scan line.

26. The system of claim 20, wherein the accumulator accumulates the absolute difference values beginning with the first scan line to the last scan line in the frame, the first scan line being located at the top of the frame.

27. The system of claim 20, wherein the 2D-to-stereoscopic converter is configured to apply the depth map to the frame in the 2D multimedia data according to a depth-image-based rendering (DIBR) technique.

* * * * *